J. Powell,
Basin Faucet.

No. 753. Reissued July 5, 1859.

Witnesses
Geo W Wright
Thomas Kile

Inventor
James Powell

N. PETERS, PHOTO-LITHOGRAPHER, WASHINGTON, D. C.

UNITED STATES PATENT OFFICE.

JAMES POWELL, OF CINCINNATI, OHIO.

IMPROVEMENT IN FAUCETS.

Specification forming part of Letters Patent No. 23,310, dated March 22, 1859; Reissue No. 753, dated July 5, 1859.

*To all whom it may concern:*

Be it known that I, JAMES POWELL, of Cincinnati, in the county of Hamilton and State of Ohio, have invented a new and useful Improvement in Faucets; and I hereby declare the following to be a full and exact description thereof, reference being had to the accompanying drawings, making part of this specification.

The said invention relates chiefly to a peculiar arrangement of mechanism for opening, closing, and guiding the valve.

Figure 1:
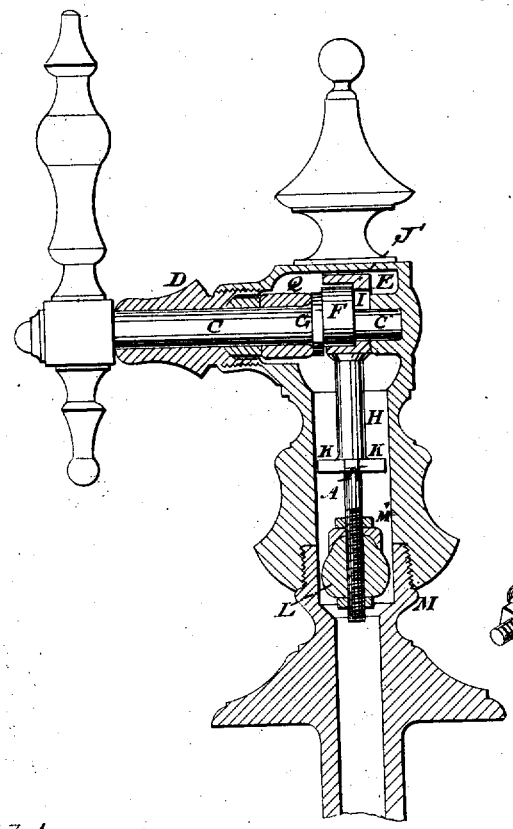
Figure 1:
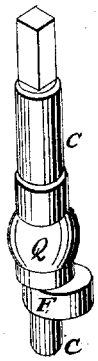
Figure 2:
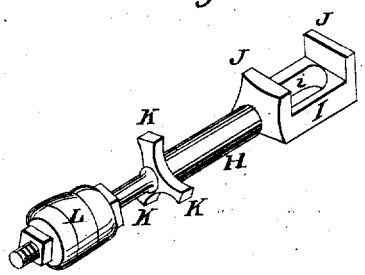

In the accompanying drawings, Figure 1 is an axial section of the valve-chamber, parallel with the operating-stem. Fig. 2 is a detached view of the two stems.

A is the valve-chamber.

C is the operating stem, which stem is confined by a suitable guide-cap, D, and terminates in a pivot, *c*, which occupies a socket, E, in the chamber B.

F is a cam or eccentric on the stem C, for operating the valve-stem H, as hereinafter explained.

G is a collar on the stem C, which acts in connection with a cushion, Q, to confine the pivot *c* within its socket. The valve-stem H has a flattened head, I, which flattened portion is slotted longitudinally, *i*, so as to receive the pivot *c* of the stem C, which is thus made effective to prevent the displacement of the head I in two directions, while it is held in the other two directions by being confined, as shown, between the socket E and cam F. The longitudinal motion necessary to open and close the valve is imparted to the valve-stem through the medium of two flanges, J and J′, on its head I, engaging on each side with the cam F.

K K K are spurs or projections on the valve-stem H, which serve to confine it to an accurately central position within the chamber, A, and guide the valve to its seat in the act of closing. The valve L is of india-rubber, and is adjustable on its stem by means of a pair of screw nuts or collars, M M′, which supply the place of the customary nut and fast collar. This valve-cock can be made at a much less expense than those now in use, is less liable to derangement, and is easily repaired without detaching the supply-pipe. The valve is operated with great facility, the cam having no stop-pins or other restriction to its sweep, nor any one arbitrary point it must assume in order to close or open the passage, the cock being effectually closed at any point of one-third of the rotation of the cam-stem, and as effectually opened at any point of the other two-thirds of its circuit.

The peculiar arrangement of the operative parts dispenses with the necessity of spring connecting screws or pins to hold the valve stem in position. The cam being confined at its periphery only by the yoke, which it touches at two opposite points only, can be easily withdrawn for inspection, cleansing, or repair of the cock. It works with the least possible friction, and the dimensions of the yoke are such as not to involve any unsightly swelling of the chamber at this part. The adjustable shoulders M M′ enable the valve to be set up as it wears, so as to dispense with the necessity of a new plug, and the parts do not require to be made with the mechanical precision which is necessary when one shoulder of the plug or valve is a fixture. It will be evident that this arrangement is equally applicable to valves closing either in the direction of the current or against it, and in either case the closing of the valve is so gradual as to avoid injurious concussion and reaction.

It is not absolutely essential that the spurs K should be attached to the valve-stem H. If preferred, they may constitute a bridge attached to the sides of the valve-chamber A, and adapted for the valve-stem to slide through it.

I claim as new and of my invention and desire to secure by Letters Patent—

The described arrangement of the cam F, flanges J and J′, longitudinal slot *i*, and spurs K, combined and operating in the manner and for the purposes set forth.

In testimony of which invention I hereunto set my hand.

JAMES POWELL.

Witnesses:
GEO. H. KNIGHT,
HENRY POWELL.